Dec. 19, 1961     R. J. ASKEVOLD     3,013,578
STATIC ELECTRICITY SENSING AND CONTROL MEANS
Filed Oct. 12, 1960

INVENTOR.
ROBERT J. ASKEVOLD
BY
*Edward N. Lang*
ATTORNEY

United States Patent Office 3,013,578
Patented Dec. 19, 1961

3,013,578
STATIC ELECTRICITY SENSING AND
CONTROL MEANS
Robert J. Askevold, Crystal Lake, Ill., assignor to The
Pure Oil Company, Chicago, Ill., a corporation of
Ohio
Filed Oct. 12, 1960, Ser. No. 62,250
7 Claims. (Cl. 137—487.5)

This invention relates to a means for sensing the presence of static electricity within storage tanks filled with liquids such as hydrocarbons, and it more particularly relates to a device for regulating the flow of fluid into a tank in response to the potential level of the sensed static electricity.

During routine handling, such as filling a storage tank, hydrocarbon liquids subject to agitation in fluid flow accumulate static electric charges. The strength of the electrostatic charge may vary depending upon the degree of agitation of the fluid as well as the resistivity of the fluid. When the electrostatic potential within a fluid body exceeds the dielectric strength of the fluid body, electrostatic discharge takes place and may cause sparking with resulting danger of fire. Similarly, potential may build up and sparking occur in the vapor space above the fluid. Since all materials have a finite, although perhaps extremely high, resistivity, it is evident that in the absence of agitation a static electric charge in a fluid body slowly becomes dissipated to the adjacent containing structure. It is also evident that as long as the rate of accumulation of static electricity is maintained at a level not exceeding the rate of static electricity dissipation, the total static charge will not increase. Accordingly, it is possible to maintain the static charge in a fluid container or conduit within safe limits by either maintaining the rate of flow at a level such that the rate of accumulation of static electricity is not greater than the rate of dissipation or by adding a material which reduces the resistivity of the fluid to maintain the desired balance between the rates of accumulation and dissipation.

It is an object of this invention to provide an apparatus for automatically adjusting the flow rate of a flowing fluid to maintain within self-dissipating limits the rate at which static electricity is generated in the fluid, thereby preventing the accumulation of static charges of such intensity as may cause sparking and explosion. Another object of this invention is to provide an apparatus for controlling the rate of addition of a resistivity-reducing additive to a flowing stream to maintain within self-dissipating limits the rate at which static electricity is generated in the fluid. Other objects of this invention will become apparent from the following detailed description.

This invention is best described with reference to the drawings, of which:

Figure 1:
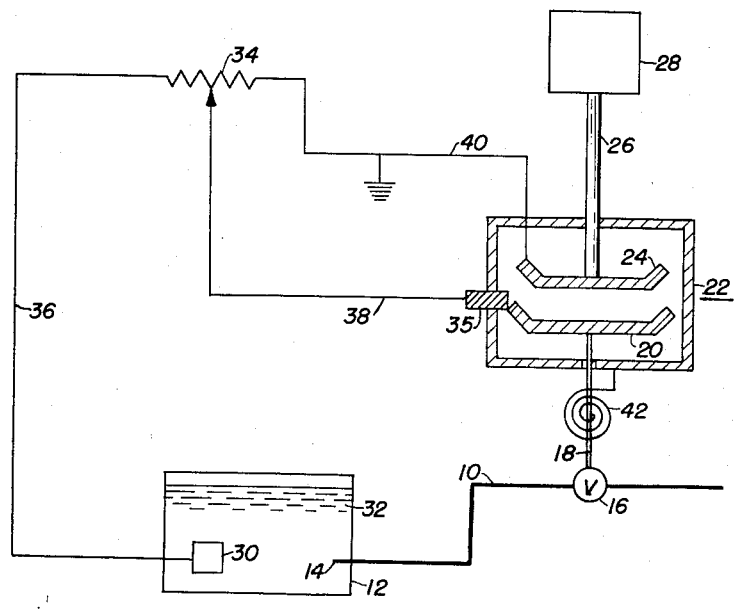
FIGURE 1 is a view, partially in section, and partially schematic, of the apparatus of this invention.

Briefly, in the apparatus of this invention, a motor-driven electro-fluid clutch device is provided on the stem of a valve in a flow line carrying a fluid which tends to generate and hold static electricity. One plate of the clutch is connecte to a static-charge-accumulating electrode positioned in the fluid at a point where static electricity is likely to exist, and the other plate is grounded, or connected to an electrode located at another point where a different static-electricity potential is likely to exist. Thus, the static electricity generate serves to modify the shear-resistance characteristics of the electro-fluid so that increases in static charge result in the transmission of increased torque through the clutch to close the valve to a point at which the flow rate decreases sufficiently to reduce the static electricity accumulation rate to a safe, self-dissipating level. A spring is provided on the valve stem to resist the turning force of the clutch and to open the valve more widely when the sensed static charge decreases.

When the rate at which static electricity is generated in the fluid becomes greater than the rate at which it is dissipated from the fluid, a charge builds up on the sensing electrode and is conducted directly, or through a voltage-reducing device, to one of the plates of an electro-fluid clutch. The increased potential difference across the clutch plates causes a stronger rotational force to be applied to the valve, this force being resisted by the spring. When the force becomes greater than the rotational resistance of the spring, the valve begins to close, reducing the flow rate and thereby decreasing the static accumulation rate. When the clutch force decreases to a point where it just balances the spring force, the valve stops at the newly established position. It is apparent that this position is dependent upon the static charge in the flowing fluid, and that it can be adjusted to a higher or lower charge level by adjustment of the balancing spring. The flow rate may be permitted to remain at the self-imposed level, or, where a greater flow rate is desired, corrective measures such as increasing the rate of addition of anti-static additives may be taken. When this has been done, and the static accumulation rate has been decreased, the spring tension will overcome the clutch force, and a new valve position, where the spring and clutch force again become balanced, is attained automatically.

In another embodiment of the invention, the control valve may be positioned in a line through which an antistatic composition is added to the flowing fluid, and the valve is used to increase or decrease the rate at which the additive is mixed with the flowing stream to maintain the static electricity level within self-dissipating limits. Various antistatic additives are known and used, and may consist merely of an additive which decreases the resistivity of the fluid. In this case, the electro-fluid clutch is adapted to open the control valve as the static potential increases, thereby increasing the rate of addition of the antistatic material. A spring may balance the torque applied to the valve by the electro-fluid clutch.

Referring to FIGURE 1, naphtha flows through line 10 into grounded storage tank 12, discharging from the inlet line at 14. The flow rate through conduit 10 is regulated by valve 16, stem 18 of which is connected to plate 20 of electro-fluid clutch assembly 22. Plate 24 of clutch assembly 22 is driven, through shaft 26, at constant rotational speed in a clockwise direction by motor 28. Static-electricity collector 30, which may be a metal plate or cable, is submerged in liquid 32 in tank 12, and is connected through grounded potentiometer 34 to bearing 35 which supports plate 20 of electro-fluid clutch 22. It will be understood that the collector 30 will be placed at the point at which static electricity is to be sensed, which point may be in the liquid or in the vapor space above the liquid. The electrical connection is made by insulated conductors 36 and 38. It is preferred that the length of these conductors be kept as short as possible, that they be thoroughly insulated, and especially that the length of the conductors extending outside of tank 12 be maintained at a minimum, to reduce the effects of atmospheric static electricity. Plate 24 of electro-fluid clutch 22 is connected to ground through lead wire 40. Valve stem 18 is connected to spiral spring 42, spring 42 being wound around stem 18 in a direction such that it tends to resist the turning force of the clutch 22, and thereby resists the closing of valve 16 by the clutch.

The properties of electro-fluids and their characteristic change of shear resistance under the influence of an applied electric field are well known, as are the compositions of various materials which exhibit this property. Descriptions of electro-fluid control mechanisms, as well as formulations of electro-fluids themselves, are adequately described in the prior art and accordingly will not be discussed here in detail. Typical prior art patents dealing with electro-fluids and electro-fluid control mechanisms are those to Winslow, especially 2,417,850 and 2,661,596. It will be understood that the electro-fluids themselves are substantially dielectric and have extremely high resistivities. Accordingly, the rate of current flow through the clutch is substantially zero. Thus the clutch will not drain off the accumulated static electricity from the zones surrounding sensing electrode 30, and thereby produce an erroneously low reading. Since the level of static potential within the tank 12 may reach very high levels, many thousands of volts, it is desirable to provide a potentiometer to eliminate the possibility of arcing across the plates of the electro-fluid clutch. Further, the variable resistance provides means, in addition to the adjustment of the tension of spring 42, for selecting the balance point to which static electricity in the container 12 will be permitted to accumulate. In order to prevent excessive bleeding of static electricity to ground, and a resulting loss of sensitivity in the system, it is evident that the resistance of potentiometer 34 should be very high, preferably as high as 1,000,000 megohms.

In operation, static electricity generated within fluid 32 in tank 12 collects on electrode 30, is reduced in magnitude by variable resistance 34, and creates a potential across plates 20 and 24 of clutch 22. When the static charge increases, the clutch potential increases, and this in turn increases the torque transmitted from plate 20 to plate 24 of the fluid clutch, disrupting the balance between the opposed rotational forces of the clutch and the spring, and starting to close the valve. When the resistance of spring 42 becomes sufficient to balance the increased clutch force, adjustment of valve 16 stops, and the flow continues at a uniform rate through conduit 10 in response to newly established valve position. When the static-accumulating propensity of the fluid is changed, as by a change of fluid composition, the clutch force may become less than the spring force at the existing valve position, and the spring then opens the valve and increases the rate of flow of fluid in conduit 10.

Figure 2:
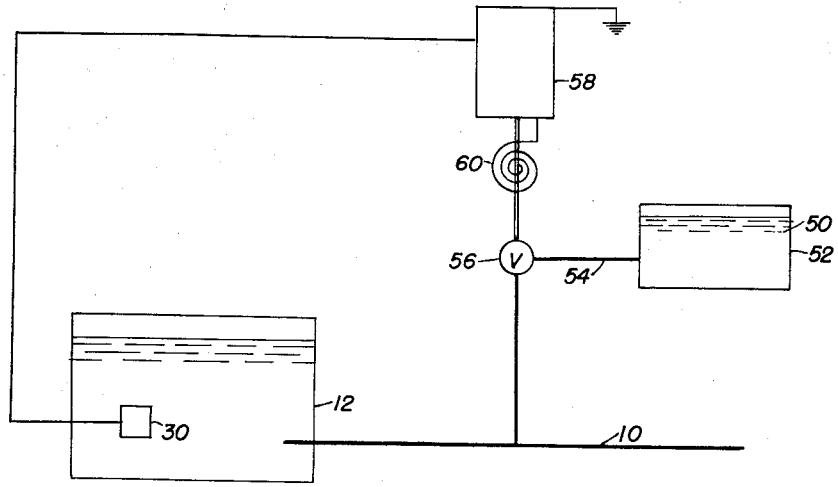
FIGURE 2 is a schematic drawing of an alternate apparatus adapted to control the rate of addition of a resistivity-modifying additive to a fluid stream.

Referring to FIGURE 2, flow line 10 conveys hydrocarbon to storage tank 12. Antistatic fluid 50 in vessel 52 is conveyed by tube 54 through control valve 56 to mix with the hydrocarbon flowing in conduit 10. Valve 56 is controlled by electro-fluid clutch 58, which is balanced by spring 60. The elecro-fluid clutch assembly 58 and spring 60 operate in the same manner as the electro-fluid clutch and spring described in reference to FIGURE 1. However, the direction of valve rotation is reversed, so that an increase in static potential sensed by electrode 30 causes electro-fluid clutch assembly 58 to open valve 56 against the tension of spring 60, thus admitting a greater quantity of antistatic fluid for admixture with the hydrocarbon flowing in conduit 10. Thus the operation of this embodiment is to increase the rate of addition of the antistatic fluid, rather than to decrease the flow rate in conduit 10.

Another less direct means for controlling the rate of addition of an antistatic fluid is for the electro-fluid clutch to control the speed of a constant-displacement injection pump, or the stroke of a constant-speed injection pump.

Various modifications of the electro-fluid clutch structure which may be employed will be obvious to those skilled in the art. For example, electro-fluid control devices other than the clutch specifically disclosed, such as those described in the patents to Winslow and others, may be employed.

The embodiments of the invention in which a special property or privilege is claimed are defined as follows:

1. In combination with a tank for liquid storage having valve-controlled inlet means for the regulated flow of liquid into said tank, a device for eliminating the buildup of static electric potential in the contents of said tank comprising an electrode disposed within the tank for sensing static electric potential, an electro-fluid clutch including an electro-fluid, a driving member and a driven member, means for continuously imparting motion to said driving member, means for moving said valve to the closed position in response to movement of said driven member, means yieldably urging said valve to the open position, and means for conducting electrical potential from said electrode to said electro-fluid so that the shear resistance of said electro-fluid varies in response to sensed static electric potential.

2. An apparatus according to claim 1 including potential-reducing means connected between said electrode and said electro-fluid.

3. In combination with a liquid storage tank having valve-controlled inlet means for the regulated flow of liquid into said tank, a device for limiting the buildup of static electricity in the contents of said tank comprising an electrode disposed within said tank for sensing static electricity, an electro-fluid clutch including a fluid receptacle, a drive member rotatively supported within said receptacle and having a surface symmetrical with the axis of rotation thereof, a driven member rotatively supported in said receptacle in coaxially aligned relation with said drive member, and having a corresponding axially-symmetrical surface, said members being supported in electrically insulated, spaced relationship, means for rotating said drive member, means for moving said valve to the closed position in response to movement of said driven member, means yieldably urging said valve to the open position, and an insulated electrical conductor connecting one of said rotatively supported members to said electrode, said other rotatively supported member being grounded.

4. An apparatus in accordance with claim 3 including a potentiometer connected between said electrode and ground, said potentiometer having a tap connected to said one member.

5. An apparatus for regulating the rate of addition of an antistatic electric material to a fluid stream comprising a conduit containing said fluid stream, a container for said antistatic electric material, a valve-controlled pipe communicating in said container with the interior of said conduit, an electrode disposed downstream of the point of communication of said conduit and pipe for sensing static electric potential, an electro-fluid clutch including an electro-fluid, a driving member and a driven member, means for continuously imparting motion to said driving member, means for moving said valve to the open position in response to movement of said driven member, means yieldably urging said valve to the closed position, and means for conducting electrical potential from said electrode to said electro-fluid so that the shear resistance of said electro-fluid varies in response to sensed static electric potential.

6. An apparatus for regulating the rate of addition of an antistatic electric material to a fluid stream comprising a conduit containing said fluid stream, a container for said material, a valve-controlled pipe connecting said conduit and said container, an electrode disposed in said fluid stream downstream of the point of communication of said pipe and conduit, an electro-fluid clutch including a fluid receptacle, a drive member rotatively supported in said receptacle and having a surface symmetrical with the axis of rotation thereof, a driven member rotatively supported in said receptacle in axially aligned relation with said drive member and having a corresponding axially-symmetrical surface, said members being supported in electrically insulated, spaced relationship, means for rotating said drive member, means for moving said valve to the open position in response to movement of said driven member, means yieldably urging said valve to the closed position, and an insulated electrical conductor connected to one of said rotatively supported members and to said electrode, the other rotatively supported member being grounded.

7. An apparatus according to claim 6 including a potentiometer connected between said electrode and ground, said potentiometer having a tap connected to said rotatable member.

References Cited in the file of this patent
UNITED STATES PATENTS 2,909,190　　Wilson ---------------- Oct. 20, 1959

OTHER REFERENCES

Electrical Engineering (AIEE), vol. 77, No. 7, July 1, 1958, "Static Electricity in the Petroleum Industry," pp. 61–614.